United States Patent
Bourqui et al.

(10) Patent No.: US 9,194,405 B2
(45) Date of Patent: Nov. 24, 2015

(54) ELECTRO-HYDRAULIC ACTUATOR WITH AN INTEGRATED BRAKE

(71) Applicant: Johnson Electric S.A., Murten (CH)

(72) Inventors: Yvan Bourqui, Corminboeuf (CH); Karin Krattinger, Kerzers (CH)

(73) Assignee: JOHNSON ELECTRIC S.A., Murten (CH)

( * ) Notice: Subject to any disclaimer, the term of this patent is extended or adjusted under 35 U.S.C. 154(b) by 456 days.

(21) Appl. No.: 13/727,184

(22) Filed: Dec. 26, 2012

(65) Prior Publication Data

US 2013/0160442 A1 Jun. 27, 2013

(30) Foreign Application Priority Data

Dec. 26, 2011 (CN) .......................... 2011 1 0442141

(51) Int. Cl.
F15B 7/08 (2006.01)
F15B 15/26 (2006.01)
H02K 7/102 (2006.01)
F16D 121/18 (2012.01)

(52) U.S. Cl.
CPC . *F15B 15/26* (2013.01); *F15B 7/08* (2013.01); *F16D 2121/18* (2013.01); *H02K 7/1025* (2013.01)

(58) Field of Classification Search
CPC ... B60T 13/745; B60T 13/748; B60T 13/667; F15B 15/26; F15B 7/08; F15D 2055/005; F16D 2121/18; H02K 7/1025
See application file for complete search history.

(56) References Cited

U.S. PATENT DOCUMENTS

| | | | | |
|---|---|---|---|---|
| 3,703,654 A | * | 11/1972 | Karubian | B27B 5/38 30/369 |
| 4,987,788 A | * | 1/1991 | Bausch | 74/89.34 |
| 5,112,116 A | * | 5/1992 | Mikhaeil-Boules et al. | 303/115.2 |
| 7,921,977 B2 | | 4/2011 | Rettmar et al. | |
| 7,967,395 B2 | * | 6/2011 | Sakai | 303/119.3 |
| 8,013,485 B2 | * | 9/2011 | Miyashita et al. | 310/77 |
| 2010/0026083 A1 | * | 2/2010 | Leiber et al. | 303/3 |

FOREIGN PATENT DOCUMENTS

| | | | | |
|---|---|---|---|---|
| JP | 2000350306 A | * | 12/2000 | B60T 8/24 |
| WO | WO 2011026826 A1 | * | 3/2011 | F16H 25/20 |

OTHER PUBLICATIONS

File Name: WO2011026826_translation.pdf Drumm, S. Linear Unit. EPO and Google Translation of WO 2011026826. pp. 1-13.*

* cited by examiner

*Primary Examiner* — Edward Look
*Assistant Examiner* — Michael Quandt
(74) *Attorney, Agent, or Firm* — Muncy, Geissler, Olds & Lowe, P.C.

(57) ABSTRACT

An electro-hydraulic actuator has a master cylinder, an electric motor and an electro-mechanical brake. The master cylinder has a hydraulic cylinder and an actuation piston slidably received within the hydraulic cylinder to vary pressure within a hydraulic circuit. The electric motor is adapted to drive the actuation piston into the hydraulic cylinder. The motor has a stator and a rotor. The electro-mechanical brake is arranged to selectively and releasably hold the rotor with respect to the stator to prevent relative rotational motion there between.

10 Claims, 2 Drawing Sheets

ELECTRO-HYDRAULIC ACTUATOR WITH AN INTEGRATED BRAKE

CROSS REFERENCE TO RELATED APPLICATIONS

This non-provisional patent application claims priority under 35 U.S.C. §119(a) from Patent Application No. 201110442141.5 filed in The People's Republic of China on Dec. 26, 2011.

FIELD OF THE INVENTION

This invention relates to an electro-hydraulic actuator and in particular, to an electro-hydraulic actuator having an integrated brake.

BACKGROUND OF THE INVENTION

An electro-hydraulic actuator comprises a motor which drives a plunger of a master cylinder of a hydraulic circuit. Such devices may be used in vehicle applications such as brake systems and clutch systems. The motor moves an actuation piston linearly into a hydraulic cylinder which increases the pressure in the whole oil circuit. During actuation, the pressure is relatively low and therefore the motor doesn't need much current (power) to provide the torque needed to move the piston. At the end of the actuation, when a physical obstacle is reached (end of stroke) the pressure increases exponentially and reaches high values. This high pressure generates a high axial counterforce on the actuation piston so a strong holding torque is needed requiring higher power to be supplied to the motor. If this holding torque needs to be provided by the motor, a high current level is required to be maintained, resulting in high energy consumption and high thermal dissipation which may lead eventually to overheating.

Presently, the energy consumed by automotive components is very important as it directly impacts the fuel consumption of a fuel powered vehicle or the battery charge life of a battery powered vehicle.

SUMMARY OF THE INVENTION

Hence, there is a desire for an electro-hydraulic actuator that is able to be operated in high holding torque mode for long periods of time without overheating and without having high energy consumption.

This is achieved in the present invention by using a motor having an electromechanical brake to maintain the high holding torque to prevent the master cylinder from back driving the motor, allowing the motor to be deactivated during the holding mode.

Accordingly, in one aspect thereof, the present invention provides an electro-hydraulic actuator for a hydraulic circuit comprising: a master cylinder comprising a hydraulic cylinder and an actuation piston slidably received within the hydraulic cylinder to vary pressure within the hydraulic circuit; an electric motor adapted to drive the actuation piston into the hydraulic cylinder, the motor comprising a stator and a rotor; and an electro-mechanical brake arranged to selectively and releasably hold the rotor with respect to the stator to prevent relative rotational motion there between.

Preferably, the electric motor is a brushless DC motor or a stepper motor.

Preferably, the electric motor has an output shaft which moves linearly along an axis.

Preferably, the electro-mechanical brake comprises an electro-magnet fixed relative to the stator and a brake disc fixed for rotation with the rotor.

Preferably, the brake disc is connected to the rotor by an elastic member that allows the brake disc to move axially of the rotor while fixing the brake disc to rotate with the rotor.

Preferably, the electro-magnet comprises an iron core and a coil disposed about the iron core and arranged to induce a magnetic field in the iron core.

Preferably, the electro-mechanical brake further comprises a friction surface and the electro-magnet is arranged to urge the brake disc into contact with the friction surface to hold the rotor to the stator.

Preferably, the friction surface is formed on the iron core.

Preferably, the iron core is an annular ring having a U-shaped cross section with a base facing the motor, an open end facing the brake disc and two sides extending between the base and the open end forming a channel, the coil being disposed in the channel.

Preferably, the brake disc confronts the open end of the iron core across an air gap when the electro-magnet is inactive.

Preferably, the brake disc confronts the friction surface across a small air gap when the brake is inactive and engages the friction surface when the brake is active.

The present invention is particularly useful for applications where the actuation time is very short, but the holding mode time is long. In some applications the holding mode time may be a very significant portion of the actuator operating time. Low energy consumption during this holding mode is therefore highly beneficial. For vehicle brake actuators the duty cycle may be less than 10% of the vehicle operating time.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
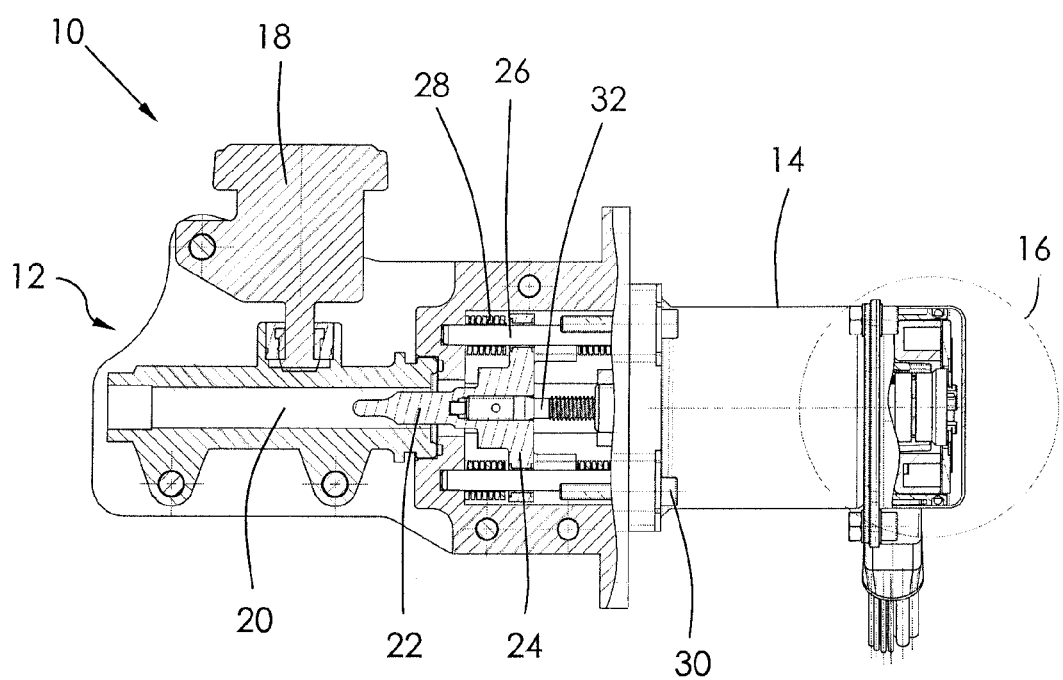
FIG. 1 is a sectional view of an electro-hydraulic actuator according to the preferred embodiment of the present invention.

FIG. 1 illustrates, in partial section, an electro-hydraulic actuator 10 in accordance with the preferred embodiment of the present invention. The actuator 10 comprises a master cylinder 12, an electric motor 14 and a brake 16. As is typical, the master cylinder is adapted to be connected to a hydraulic circuit (not shown) for driving one or more slave cylinders. The slave cylinders are arranged to move something, such as a clutch shifter which has two operating positions and requires a controlled movement between the two positions, or a squeezing action, such as a brake pad in a brake system where the movement of slave cylinder is controlled to change the amount of force applied to the brake pad and thus the amount of friction applied by the brakes. In both situations, there is a certain level of push back against the actuation piston in the master cylinder which increases as the force applied by the hydraulic circuit increases.

The master cylinder has an oil reservoir, for storing the working fluid, hydraulic oil. The oil reservoir is in communication with a hydraulic cylinder. An actuation piston 22 is arranged to slide along the hydraulic cylinder, such that a first end of the piston enters the hydraulic cylinder. One or more seals seal the actuation piston to the hydraulic cylinder to prevent the escape of the hydraulic fluid as the actuation piston compresses the hydraulic fluid. The actuation piston 22 has an enlarged head or flange 24 located at a second end remote from the first end of the piston which enters the hydraulic cylinder. The flange preferably is located at the second end, but may be located between the first and second ends. The flange however does not enter the hydraulic cylinder and thus its location may have an affect on the axial movement or stoke of the actuation piston. The flange cooperates with one or more guide pins 26 to align the piston with the cylinder. The guide pins 26 support return springs 28 which extend between the flange and the body of the master cylinder 12 for returning the actuation piston to the home or rest position.

The motor 14 is fixed to the body of the master cylinder 12, preferably by screws 30. The motor is a brushless DC motor or a stepper motor. The rotational movement of the motor's rotor is transformed into a linear movement of a threaded output shaft 32 aligned with the rotation axis of the motor. The output shaft 32 is arranged to bear against the actuation piston so as to push the piston from the rest position into the hydraulic cylinder 20 to pressurize the hydraulic circuit. The output shaft is shown being received in a blind hole extending axially in the second end of the actuation piston.

Figure 2:
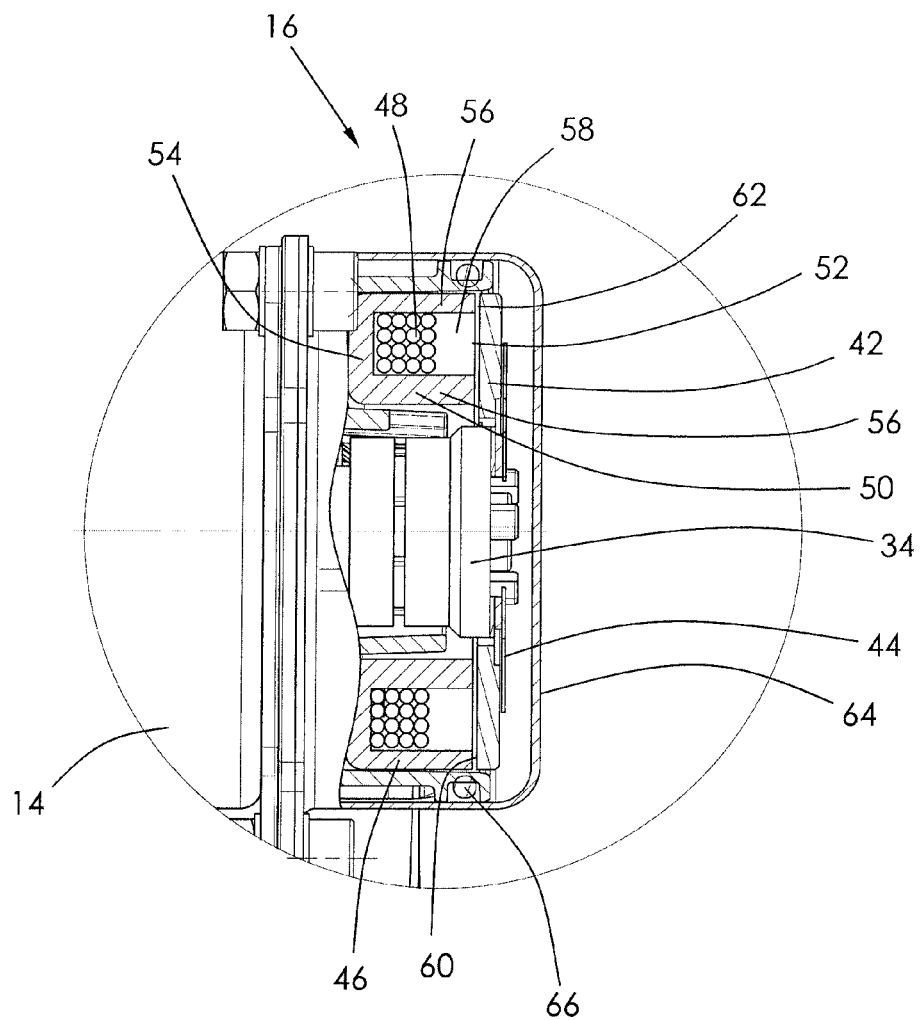
FIG. 2 is an enlarged sectional view of a brake mechanism, being a part of the actuator of FIG. 1.

Attached to the other end of the motor 14 is an electromechanical brake 16. The brake 16 is shown in section on a larger scale in FIG. 2. The brake comprises an electro-magnet 46 and a brake disc 42 connected to an end of the rotor 34 of the motor by a resilient or elastic member such as a membrane spring 44. The membrane spring allows the brake disc to move axially against the urging of the spring but does not allow circumferential or rotational movement between the rotor 34 and the brake disc 42. The electro-magnet has a coil 48 and an annular iron core 50. The iron core has a U-shaped cross section having an open end 52 facing the brake disc 42 with the base 54 of the U adjacent the motor 14. Two sides 56 extend from the base to the open end forming an annular channel 58 and the coil 48 is wound or otherwise disposed within the channel 58. The spring 44 supports the brake pad at a rest position confronting, but axially spaced from the core 50 of the electro-magnet by a small air gap 62. When the electro-magnet is activated the brake disc is magnetically attracted to and latches into the electro-magnet against the resilient urgings of the membrane spring 44 to hold the rotor stationary with respect to the core of the electro-magnet. The open end 52 of the iron core, that is the axial ends of the sides 56, form a friction surface 60, which engages the bake disc when the brake is operated. The core 50 of the electro-magnet is pressed into or otherwise fixed to a brake cover 64 which is secured to the housing or stator part of the motor. Alternatively, the core may be connected to the motor directly or indirectly through a brake mount. A seal such as an O-ring seal 66 may be provided to seal the brake against water ingress.

In use, the master cylinder 12 is operated by the motor 14 pressing the actuation piston 22 into the hydraulic cylinder 20 to pressurize the hydraulic circuit. Once the desired pressure has been reached, the electric motor is turned off at which time the return springs 28 urge the actuation piston 22 to back drive the motor so as to return to the rest position. Should it be desired to maintain the pressure in the circuit, instead of maintaining the power to the motor, the electro-magnet 46 is activated operating the brake by pressing the brake disc 42 against the friction surface 60 of the iron core 50, thereby holding the motor against being driven by the actuation piston and maintaining the pressure in the hydraulic circuit while using significantly less power than continually powering the motor. When the pressure in the circuit is to be reduced, the electro-magnet is turned off and the motor is operated to release the actuation piston at the desired release speed and by the desired amount. Similarly, if more pressure is desired in the circuit, the motor is operated and the electro-magnet is deactivated to release the brake to allow the motor to drive the actuation piston further into the hydraulic cylinder. Thus the electro-magnet is deactivated to release the brake when required to allow the actuation piston to be moved to its new desired position. When turned off, the electro-magnet releases the brake disc and the membrane spring 44 returns the brake disc to the rest position in which the brake disc is clear of the friction surface, allowing the rotor to rotate.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the membrane spring is a simple arrangement for connecting the brake disc to the rotor, allowing the disc to be moved axially by the electro-magnet to engage the friction surface and to resiliently return the disc to the rest position when the magnet is turned off. It also prevents rotational movement between the disc and the rotor. This same function could be achieved by other arrangements such as a spline connection between the rotor and the brake disc with a coil spring arranged to urge the disc to the rest position.

Additionally, although the specific example describes an actuator in which the brake is applied when the electro-magnet is activated, the reverse arrangement is also possible, in which the brake is applied by the spring and the electro-magnet is activated to release the brake against the urging of the spring. The preferred type of arrangement will depend on the operating requirements of the system, including the requirements on failure.

The invention claimed is:

1. An electro-hydraulic actuator for a hydraulic circuit comprising:
   a master cylinder comprising a hydraulic cylinder and an actuation piston slidably received within the hydraulic cylinder to vary pressure within the hydraulic circuit;
   an electric motor adapted to drive the actuation piston into the hydraulic cylinder, the motor comprising a stator and a rotor; and
   an electro-mechanical brake arranged to selectively and releasably hold the rotor with respect to the stator to prevent relative rotational motion there between;
   the electro-mechanical brake comprising a brake disk fixed for rotation with the rotor and connected to the rotor by an elastic member that allows the brake disc to move axially of the rotor while fixing the brake disc to rotate with the rotor.

2. The actuator of claim 1, wherein the electric motor is a brushless DC motor or a stepper motor.

3. The actuator of claim 1, wherein the electric motor has an output shaft which moves linearly along an axis.

4. The actuator of claim 1, wherein the electro-mechanical brake further comprises an electro-magnet fixed relative to the stator.

5. The actuator of claim 4, wherein the electro-magnet comprises an iron core and a coil disposed about the iron core and arranged to induce a magnetic field in the iron core.

6. The actuator of claim 5, wherein the electro-mechanical brake further comprises a friction surface and the electro-magnet is arranged to urge the brake disc into contact with the friction surface to hold the rotor to the stator.

7. The actuator of claim 6, wherein the friction surface is formed on the iron core.

8. The actuator of claim 6, wherein the iron core is an annular ring having a U-shaped cross section with a base facing the motor, an open end facing the brake disc and two sides extending between the base and the open end forming a channel, the coil being disposed in the channel.

9. The actuator of claim 8, wherein the brake disc confronts the open end of the iron core across an air gap when the electro-magnet is inactive.

10. The actuator of claim 8, wherein the brake disc confronts the friction surface across an air gap when the brake is inactive and engages the friction surface when the brake is active.

\* \* \* \* \*